United States Patent [19]

Joy

[11] Patent Number: 4,560,626
[45] Date of Patent: Dec. 24, 1985

[54] RAPIDLY REFUELABLE FUEL CELL

[75] Inventor: Richard W. Joy, Santa Clara, Calif.

[73] Assignee: The United States of America as represented by the United States Department of Energy, Washington, D.C.

[21] Appl. No.: 420,053

[22] Filed: Sep. 20, 1982

[51] Int. Cl.⁴ .................. H01M 8/02; H01M 8/18
[52] U.S. Cl. ................................ 429/27; 429/19; 429/66
[58] Field of Search .............. 429/19, 12, 27, 28, 429/66, 36

[56] References Cited

U.S. PATENT DOCUMENTS

| | | | |
|---|---|---|---|
| 3,043,898 | 7/1962 | Miller et al. | 429/27 |
| 3,759,748 | 9/1973 | Palmer | 429/28 |
| 4,091,174 | 5/1978 | Ruch et al. | 429/27 |
| 4,317,864 | 3/1982 | Strasser | 429/36 |

FOREIGN PATENT DOCUMENTS

| | | | |
|---|---|---|---|
| 1223127 | 2/1971 | United Kingdom | 429/27 |
| 1231423 | 5/1971 | United Kingdom | 429/27 |

Primary Examiner—Donald L. Walton
Attorney, Agent, or Firm—L. E. Carnahan; Roger S. Gaither; Judson R. Hightower

[57] ABSTRACT

A rapidly refuelable dual cell of an electrochemical type wherein a single anode cooperates with two cathodes and wherein the anode has a fixed position and the cathodes are urged toward opposite faces of the anodes at constant and uniform force. The associated cathodes are automatically retractable to permit the consumed anode remains to be removed from the housing and a new anode inserted between the two cathodes.

10 Claims, 2 Drawing Figures

RAPIDLY REFUELABLE FUEL CELL

BACKGROUND OF THE INVENTION

The United States Government has rights in this invention pursuant to Purchase Order No. 5513309 with The Continental Group, Inc., under Prime Contract No. W-7405-ENG-48 between the University of California and the United States Department of Energy.

RELATED APPLICATION

This application is an improvement over the fuel cell described and claimed in my copending application Ser. No. 270,113, filed June 3, 1981, now U.S. Pat. No. 4,389,466 issued June 21, 1983.

This invention relates in general to electrochemical fuel cells of the type having a consumable anode which requires periodic replacement. In particular, this invention relates to electrical energy producing cells having a consumable reactive metal anode and wherein the cell construction is such that the anode can be rapidly replaced. More particulary this invention relates to a cell construction wherein each cell includes a single anode for each pair of cathodes.

In my rapidly refuelable cell described and claimed in the above referenced application there was one anode for each cathode, and thus, in a multi-cell unit, numerous anodes have to be replaced. This resulted in substantial replacement time and costs. Thus a need existed for a multi-cell unit which was more cost effective.

SUMMARY OF THE INVENTION

An object of the invention is to provide a dual cell arrangement for electrochemical fuel cells.

A further object of the invention is to provide a multi-cell arrangement for electrochemical cells wherein each cell utilizes a single anode and a pair of cathodes.

Another object of the invention is to provide a dual cell arrangement for an electrochemical cell which uses a replaceable anode interposed between a pair of cathodes.

Other objects of the invention will become apparent to those skilled in the art.

In accordance with this invention, each cell is actually a dual cell and there is but a single anode for two cathodes, thereby reducing by fifty percent the number of anodes which must be replaced and in a like manner providing a similar reduction in anode replacement time.

Most particularly, this invention relates to a rapidly refuelable fuel cell which includes a housing having at least two opposite walls, an anode support carried by one of the walls within the housing and generally defining the position of the anode within the housing, an anode supply opening in the other of the walls in alignment with the anode support, a cathode opposing opposite sides of the anode position for cooperation with an anode to form dual cells, pressure devices for separately urging each cathode at a constant force toward the anode position, and apparatus for supplying an electrolyte between each of the cathodes and the anode position.

With the above and other objects in view that will hereinafter appear, the nature of the invention will be more clearly understood by reference to the following detailed description, the appended claims, and the embodiment illustrated in the accompanying drawing.

DETAILED DESCRIPTION OF THE INVENTION

Figure 1:
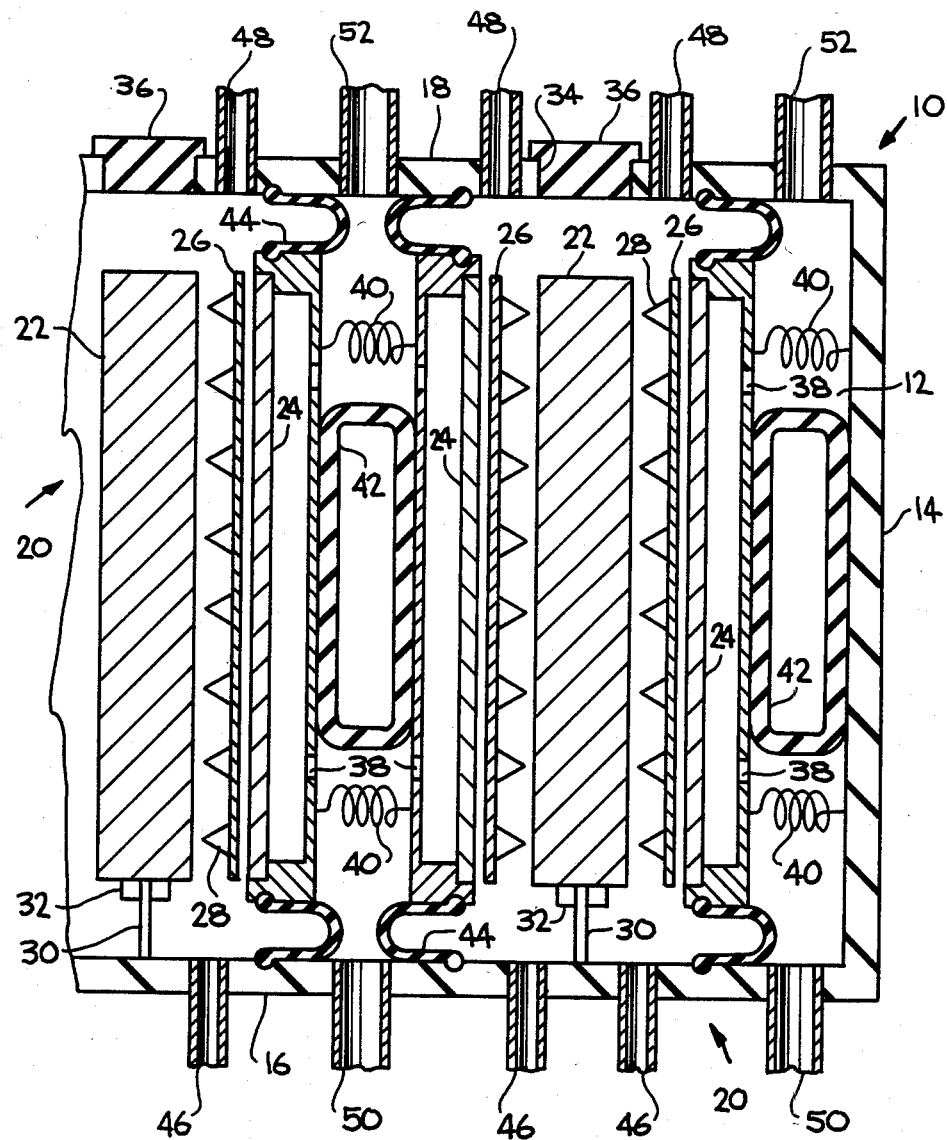
FIG. 1 illustrates in cross-section a portion of an embodiment of an electrochemical cell using the dual cell arrangement of the invention.

In the drawings there is illustrated an embodiment of an electrochemical cell made in accordance with the present invention. The cell comprises a housing 10 which, for descriptive purposes, may be rectangular in cross section, constructed of any structural material that is compatible with the electrolyte, and includes two upstanding side walls, one of which is indicated at 12, end walls 14 (only one shown), a bottom plate or end 16, and a top plate or end 18. Only an end portion of the housing 10 has been illustrated with the understanding that the housing 10 may have as many cells formed in accordance with this invention as may be desired or practical.

As set forth above, each of the cells located in housing 10 is a dual cell and each cell is generally identified by the numeral 20. Only one complete duel cell 20 is shown. Each cell 20 includes a consumable metal anode 22, constructed of selective reactive material such as aluminum and lithium, which is preferably in a fixed position relative to the housing 10. On opposite sides of the anode 22 are cathodes 24, which may be of the type described in the above-referenced application and are made by conventional methods. Between the cathodes 24 and the adjacent faces of the anode 22 are current collectors 26 having suitable means such as pointed projections 28 for providing a good mechanical-electrical contact with the adjacent face of the anode 22. The construction of the current collectors 26 may be similar to those described in the above-referenced application and shown in greater detail in FIG. 2. While not shown, current collectors 26 are operatively connected to an electrical take-off which extends through top 18.

Figure 2:
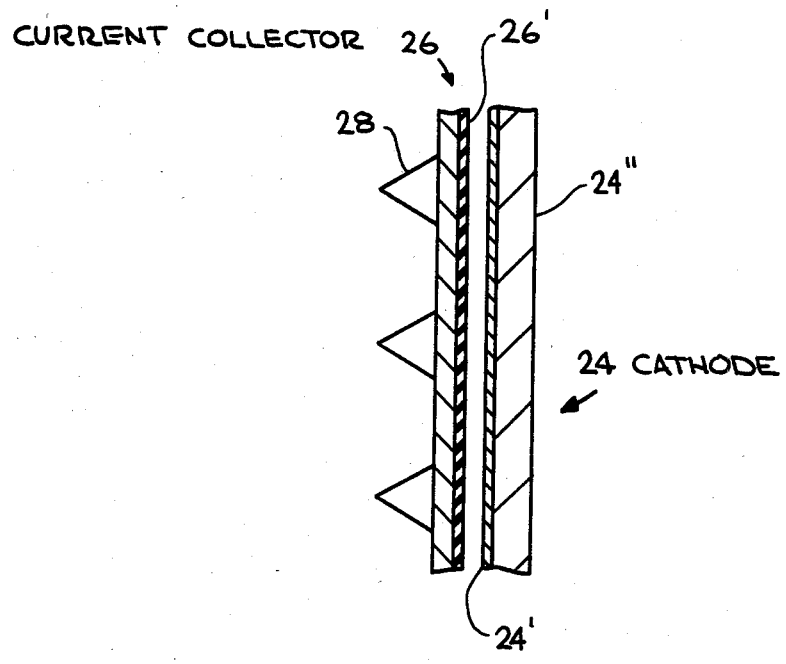
FIG. 2 is an enlarged cross-sectional view of a section of a cathode-current collector arrangement of the FIG. 1 cell.

FIG. 2 illustrates an enlarged section of cathode 24-current collector 26 as described in the above-referenced application. The cathode 24, as described hereinafter, consists, for example, of a catalyzed Teflon bonded sheet 24' backed by a porous ridged support 24''. The current collector 26, in addition to the pointed projections 28 on one side includes an insulating layer 26' on the opposite side adjacent cathode 24, as also described in the above-referenced application to insulate the current collector 26 relative to the cathode 24. The thickness of the various layers constituting cathode 24 and current collector 26 are illustrative only and such are not shown intended to be proportional or to scale.

In accordance with this invention, the bottom end 16 of housing 10 carries for each anode 22 an upstanding support 30 on which a respective anode 22 is seated and with which mounting means 32 carried by a lower edge of the anode 22 is interlocked. Support 30 and mounting means 32 may, for example, be constructed of structure material that is compatable with the electrolyte. Thus, each anode 22 is maintained in a fixed position and during the operation of the cell 20 in which the anode will be consumed toward the center from the opposite faces thereof.

In order to facilitate positioning and replacement of the anode 22, the top end 18 of the housing 10 is provided with a transverse opening or slot 34 of a width and length to permit the passage of the anode 22. The opening or slot 34 is normally closed by a tight fitting or otherwise sealed closure 36. It is understood that the housing 10 will be provided with a slot 34—closure 36 arrangement for each anode of each dual cell contained within housing 10.

The cathodes 24, which may be of the metal-air or metal-$O_2$ type known in the art, are each carried by a cathode support 38 which is hollow or constructed of porous material so that the air or $O_2$ may be presentable to the cathodes 24. The cathodes, for example, as described briefly above, may be formed of a suitably catalyzed Teflon bonded sheet backed by a porous rigid support of reticulated vitrious carbon (RVC) having a porosity range of from about 8 to about 110.

Each cathode support is urged away from the position of the anode 22 by means of tension springs 40. Thus, in the initial position of the components of each dual cell 20, as shown in the drawing, the cathodes 24 are retracted relative to each other a desired distance wherein the current collectors 26 may be out of the path of a new anode 22 so that the substantially consumed old anode may be readily removed and a new anode positioned between the current collectors. With respect to this, it is to be understood that the current collectors 26 are preferably so connected to the cathode supports 38 by means not shown so as to be retractable with the cathode supports and the cathodes.

In order that the cathodes 24 may be accurately positioned and maintained relative to the anode 22 during the operation of the dual cell and that the current collectors 26 engage opposite faces of the anode 22 with equal force over the surface of the anode, there is engaged with a remote surface of each anode support 38 an expandable bladder 42 which, when internally pressurized, will urge the cathode supports 38 toward one another and tightly clamp the cathodes 24 against the current collectors 26 which, in turn, are tightly engaged with the opposite surfaces of the anode 22. It will be seen that with respect to an endmost cell 20, the associated bladder 42 will have one surface bearing against the end wall 14 and the other surface bearing against the cathode support 38. On the other hand, an intermediate bladder 42 will be engaged on opposite sides with two adjacent cathode supports 38. The bladder 42 may be constructed in the manner described in the above-referenced application, and may be made of a suitable rubber, such as neoprene, with an air supply, not shown, operatively connected therewith.

In accordance with this invention, a suitable electrolyte, such as NaOH with aluminium and sodium stannate dissolved therein, and the like will be directed between the opposite faces of the anode 22 and the adjacent current collectors 26. In order to define the path of electrolyte through the housing 10, each cathode support is sealed relative to the housing 10 by a rolling diaphragm-type seal 44 which is interlocked with the periphery of the associated cathode support 38 and the interior of the wall 12, bottom end 16, and top end 18 of the housing 10.

The electrolyte will be directed into the space between a pair of cooperating seals 44 and around opposite faces of each anode by electrolyte supply pipes or tubes 46, with the spent electrolyte exiting through like tubes 48.

It is also to be understood that each cathode 24 and preferably a pair of such cathodes arranged in back-to-back relation has the necessary air or $O_2$ supplied therethrough through a supply pipe 50 which preferably passes through the bottom end 16 and which exits through an exit pipe 52 carried by the top end 18 of housing 10.

As pointed out above, although only a terminal dual cell 20 and portions of an intermediate dual cell are illustrated, there may be plural intermediate dual cells within the housing 10. The current collectors of the cells may be electrically interconnected in any desired manner. Further, it is to be understood that necessary fluid pressure lines and controls (not shown) may be coupled to the bladders 42 for controlled inflaction of the bladders 42 to the desired pressure.

Although only a single preferred embodiment of the invention has been specifically illustrated and described herein, it is to be understood that minor variations may be made in the cell construction without departing from the spirit and scope of the invention as defined by the appended claims.

What is claimed is:

1. A refuelable fuel cell comprising a housing including two opposite walls, an anode support carried by one of said walls within said housing and generally defining the position of an anode within said housing, an anode supply opening in the other of said walls in alignment with said anode support, a pair of cathodes positioned on opposite sides of said anode position for cooperation with an anode to form dual cells, pressure means for separately urging each cathode at a constant force towards said anode position, and means for supplying an electrolyte between each of said cathodes and said anode position.

2. A fuel cell in accordance with claim 1 wherein said pressure means is in the form of an inflatable member.

3. A fuel cell in accordance with claim 1 wherein said pressure means is collapsible, and there are means resiliently urging said cathodes to retracted positions.

4. A fuel cell in accordance with claim 1 wherein there is an anode positioned between said cathodes on said support, and said anode support is positioned to maintain said anode in a centered position between said cathodes.

5. A fuel cell in accordance with claim 4 wherein there is a current collector between each cathode and said anode.

6. A fuel cell in accordance with claim 4 wherein each cathode is carried by a cathode support and there are seals between each cathode support and said housing defining an electrolyte path traversely of said housing between said cathodes and around said anode.

7. A fuel cell in accordance with claim 6 wherein said housing is elongated and contains a plurality of said dual cells in adjacent back-to-back relation, and at least certain of said pressure means are disposed between adjacent cathode supports of adjacent dual cells and react simultaneously on both such cathode supports.

8. A fuel cell in accordance with claim 4 wherein said housing is elongated and contains a plurality of said dual cells in adjacent back-to-back relation, and at least certain of said pressure means are disposed between adjacent cathodes of adjacent dual cells and react simultaneously on both such cathodes.

9. A fuel cell in accordance with claim 1 wherein said housing is elongated and contains a plurality of said dual cells in adjacent back-to-back relation, and at least certain of said pressure means are disposed between adjacent cathodes of adjacent dual cells and react simultaneously on both such cathodes.

10. A fuel cell in accordance with claim 9 together with means for supplying a reactive fluid to said adjacent cathodes between said adjacent cathodes.

* * * * *